April 29, 1941.  E. LAKATOS  2,240,306
ELECTROMECHANICAL FILTER
Filed Oct. 24, 1939  4 Sheets-Sheet 1
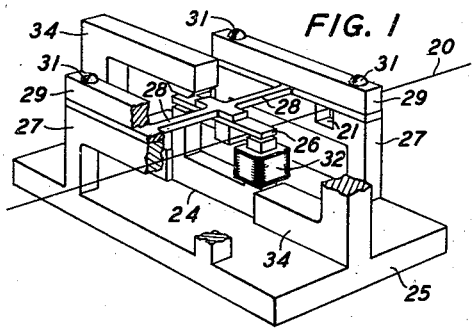
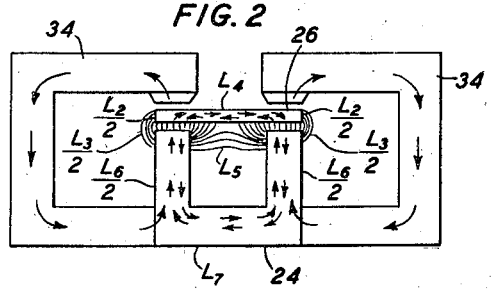
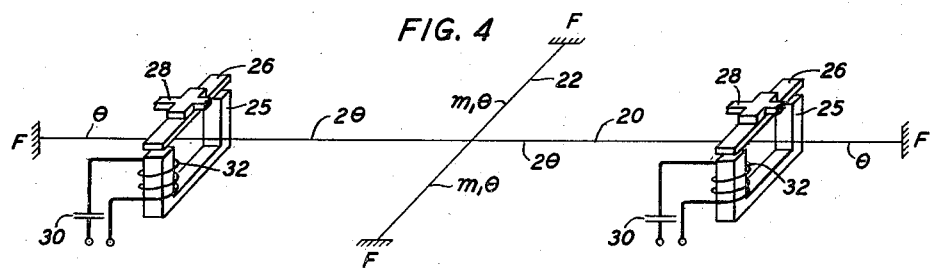
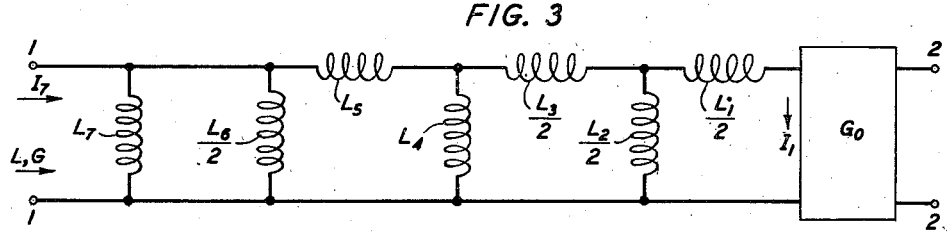
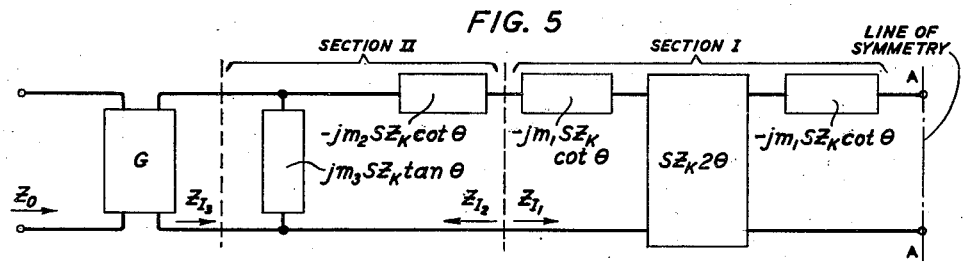
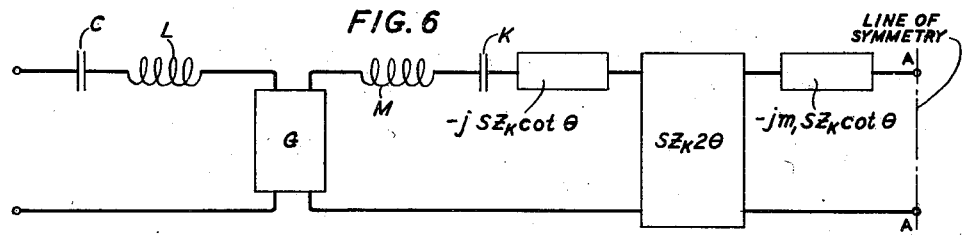
INVENTOR
E. LAKATOS
BY H. O. Wright
ATTORNEY INVENTOR
E. LAKATOS
BY H. O. Wright
ATTORNEY April 29, 1941.  E. LAKATOS  2,240,306
ELECTROMECHANICAL FILTER
Filed Oct. 24, 1939  4 Sheets-Sheet 3

INVENTOR
E. LAKATOS
BY
H. O. Wright
ATTORNEY

INVENTOR
E. LAKATOS
BY H. O. Wright
ATTORNEY

Patented Apr. 29, 1941

2,240,306

UNITED STATES PATENT OFFICE 2,240,306

ELECTROMECHANICAL FILTER

Emory Lakatos, New York, N. Y., assignor to Bell Telephone Laboratories, Incorporated, New York, N. Y., a corporation of New York Application October 24, 1939, Serial No. 301,088

4 Claims. (Cl. 178—44)

This invention relates to electromechanical filters and more particularly to improved filters of the type which employs stretched wires.

In stretched-wire filters of the prior art, as, for example, those of my Patent 2,056,281, issued October 6, 1936, and of Patent 2,086,597, issued July 13, 1937, to R. B. Blackman, energy input and output is effected by currents passing through tensed wires positioned in steady magnetic fields.

While admirable for many uses, difficulties are encountered with such filters, particularly as the frequency range in which they are employed is raised, because of a tendency of the current-carrying wires to vibrate in unwanted modes. In general, too, the impedance levels for which stretched-wire filters of the prior art may be conveniently constructed are somewhat lower than the impedance levels of many frequently used communication circuits so that step-up transformers must commonly be employed at each end of the prior art filters.

Both of the above-described limitations may be avoided and in addition the over-all filter structure may be simplified by employing magnetic-attraction type electromechanical transducers in place of the electrodynamic arrangements employed in the prior art to supply power to and withdraw it from stretched-wire filter structures.

A further difficulty at times encountered with stretched-wire filters of the prior art is that the transverse wires are found to be sufficiently massive that the flexural stiffness of the wire may introduce undesirable effects. In such instances, it is shown hereinafter that the transverse wire may be replaced by a lumped mass and a discrete stiffness, resonant at the same frequency as the transverse wire and proportioned to provide an equivalent mechanical impedance.

It is accordingly an object of this invention to provide simpler and more economical stretched-wire filters, and improved methods of designing and constructing them.

Another object is to eliminate the necessity of employing impedance transformers with stretched-wire filters when they are to be employed in communication circuits of the normally used impedance levels.

Another object is to provide an improved type of electro-magnetic electromechanical transducer for use with electromechanical filters.

A further object is to avoid possible difficulties arising from unwanted modes of vibration of the electrodynamic driving mechanisms of stretched-wire filters of the prior art.

Another object is to extend the frequency range within which satisfactory performance may be obtained from stretched-wire filters.

Other objects will appear during the course of the following description and in the appended claims.

The principles underlying the invention may be more readily understood in connection with the specific embodiments of the invention described hereinunder and from the accompanying drawings, in which:

Fig. 1 shows an improved form of magnetic attraction electromechanical transducer suitable for use in filters of this invention;

Fig. 2 is illustrative of the flux distribution obtaining in the device of Fig. 1;

Fig. 3 shows in schematic form an equivalent electrical circuit for the device of Fig. 1;

Fig. 4 shows in diagrammatic form a filter of this invention;

Figs. 5 and 6 are schematic electrical circuit block diagrams which will be employed in the explanation of the design of structures of this invention;

Figure 8:
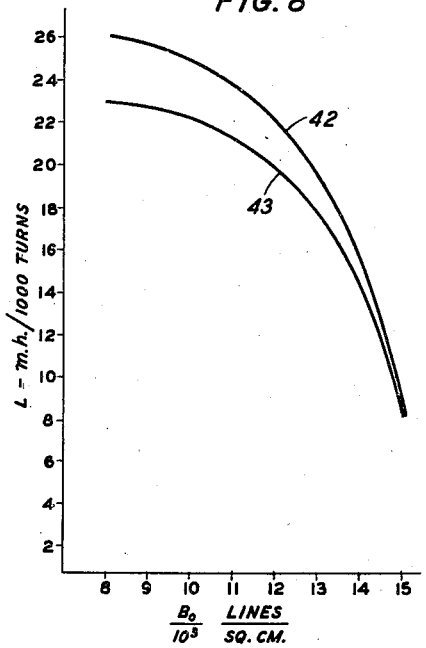
Figure 9:
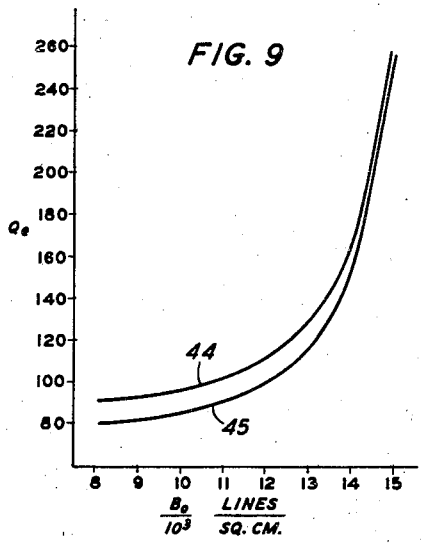
Figure 10:
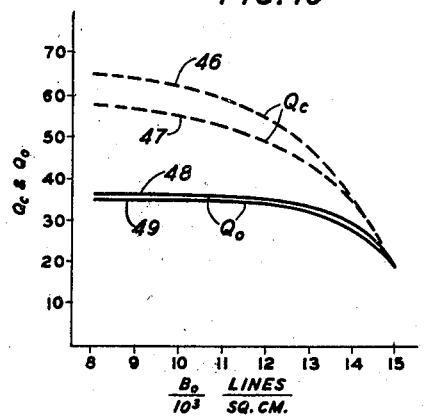
Figure 11:
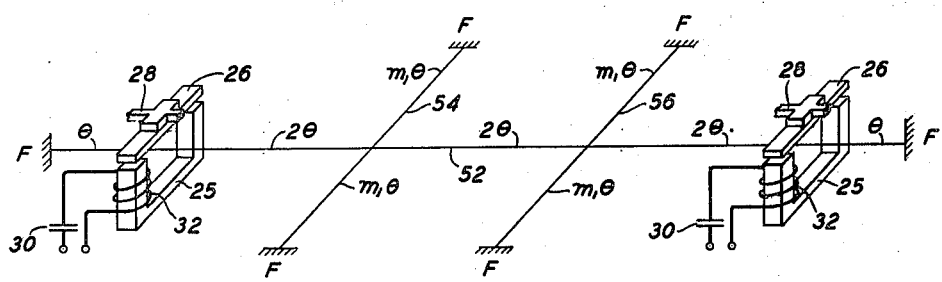
Figure 12A:
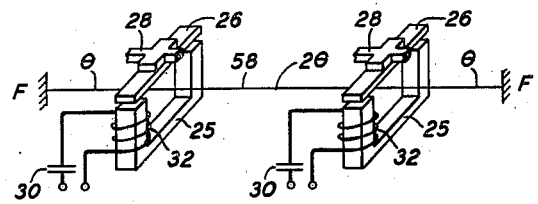
Figure 12B:
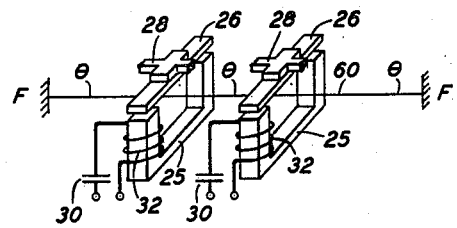
Figure 13:
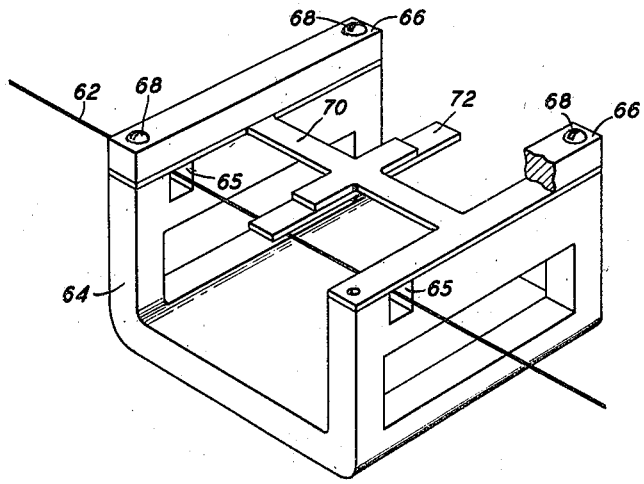
Figure 14:
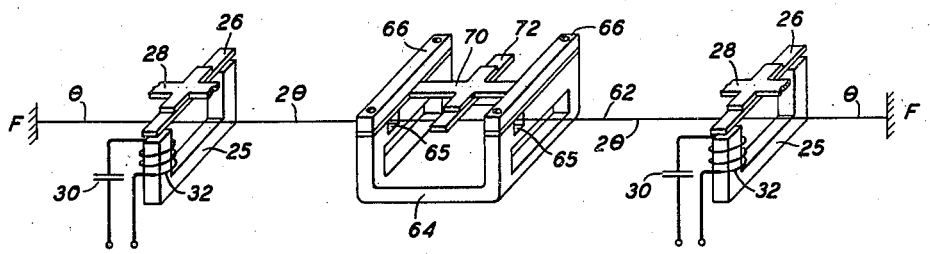

with flux density $B_0$ of the transducer of Fig. 1;

Fig. 8 shows variation of the inductance $L$ of the transducer of Fig. 1 per 1,000 turns of the transducer windings with flux density $B_0$;

Fig. 9 shows the variation of the index of electrical efficiency $Q_e$ with respect to eddy-current losses for variations in flux density $B_0$;

Fig. 10 shows the variation of the indices of electrical efficiency $Q_c$ and $Q_0$, with respect to copper losses alone and with respect to over-all losses respectively for variations in flux density $B_0$;

Fig. 11 shows how additional sections may be added to the filter illustrated in Fig. 4 by merely lengthening the longitudinal wire and adding a transverse wire for each desired additional section;

Figs. 12A and 12B show filters of this invention employing only a single stretched wire for each filter in addition to the input and output transducers;

Fig. 13 shows a lumped mass supported on a discrete elastance, the combination providing an alternative structure for use in place of transverse wires when the latter cannot be given convenient mechanical proportions; and Fig. 14 illustrates the use of the device of Fig. 13 in a filter structure similar to that of Fig. 4.

In more detail, the illustrative filter system diagrammatically represented in Fig. 4 is a band-pass filter and comprises, in addition to the transducers 25 (shown in detail in Fig. 1), a stretched wire 20, the length of which is 3/2 wave-lengths of the mid-frequency of the band to be transmitted, and a second stretched wire 22, arranged transversely to wire 20. The two wires are firmly attached to each other at their respective center points. Wire 22 is 1/2 wave-length of the mid-band frequency long. Cross-hatchings F at each end of both wires indicate points of attachment to a fixed frame support.

The input and output electrical transducers 25, the mechanical construction of which is shown in more detail in Fig. 1, are located 1/4 wave-length of the mid-band frequency from the ends of the wire 20 of Fig. 4. The transducers 25 are of the rocking armature type and the connections between the central wire 20 and the armatures 26 may be made by simply mounting the transducers so that the armatures press against the wire. The system is obviously designed to transmit vibratory energy, the direction of which is substantially normal to the common plane of the stretched wires and transducer armatures. The armatures 26 are, as shown in Fig. 1, supported on torsional springs 28, the elastances of the springs and the armature and spring masses are proportioned so that each spring and associated armature is tuned to the mid-band frequency of the filter. The ends of spring 28 are clamped to supports 27 by blocks 29 and screws 31. Supports 27 have suitable openings 21 through which the wire 20 may be stretched without physical contact with the supports. On the electrical side of each transducer 25, a series condenser 30, shown in the diagram of Fig. 4, is added in series with the transducer winding 32. The capacity of the condenser is such as to resonate with the inductance of the winding at mid-band. Winding 32 is normally divided into halves, one half being assembled on each of the two vertical portions of core 24. In Fig. 1 the left half of winding 32 has been omitted and parts of the right magnet 34, of the front end of spring 28, of the forward support 27 and of the forward clamping block 29 have been broken away to more clearly show the features of the assembly.

In the explanation of the theory of the structures of this invention the following symbols will be used:

$S$ = area of central wire in square centimeters;
$Z_K$ = characteristic impedance per square centimeter of central wire;
$\theta$ = phase shift in radians of a transmission line or in the filters of this invention of a section of stretched wire whose length is 1/4 wave-length at the mid-band frequency of the filter;
$\theta_1$ = the particular value of $\theta$ which occurs at either the upper or lower cut-off frequency of the filter;
$m$ = the ratio of the characteristic impedance of any particular wire to that of the central wire;
$G$ = force factor, dynes per abampere;
$M$ = effective mass of transducer armature and its associated supporting torsional spring in grams;
$K$ = effective stiffness of transducer spring in dynes per centimeter;
$L$ = damped inductance of the transducer;
$C$ = capacitance of the condenser 30 associated with each transducer.

We will assume that the illustrative system shown in Fig. 4 is symmetrical and that, therefore, we need analyze only one half of it as represented by the network shown in Fig. 5, to the left of the line of symmetry A—A, it being understood that the right half of the network (not shown) is precisely symmetrical with the left half shown in Fig. 5. Sections I and II are proportioned to be "infinity" type sections having $2\pi$ and $\pi$ radians phase shift, respectively, $Z_{I_1}$ and $Z_{I_2}$ are "mid-series" type image impedances and $Z_{I_3}$ is "mid-shunt." By calculations employing the open- and short-circuit impedances in a manner well known in the art of filter design it is found that $$Z_{I_1} = SZ_K \sec \theta_1 \sqrt{1-\tan^2\theta_1 \cdot \cot^2\theta} \qquad (1)$$

$$m_1 = \tan^2 \theta_1 \qquad (2)$$

$$Z_{I_2} = m_2 SZ_K \cot \theta_1 \sqrt{1-\tan^2\theta_1 \cdot \cot^2\theta} \qquad (3)$$

$$Z_{I_3} = \frac{m_2 SZ_K \cot \theta_1}{\sqrt{1-\tan^2\theta_1 \cot^2\theta_1}} \qquad (4)$$

and $$\frac{m_2}{m_3} = \tan^2 \theta_1 \qquad (5)$$

For matched impedances, $$Z_{I_1} = Z_{I_2} \qquad (6)$$

or $$m_2 = \sec \theta_1 \tan \theta_1 \qquad (7)$$

Hence $$m_3 = \csc \theta_1 \qquad (8)$$

Using this relationship, the image impedance levels at mid-band, i. e., $\theta = \pi/2$, become $$Z_{o1} = Z_{o2} = Z_{o3} = SZ_K \sec \theta_1 \qquad (9)$$

The physical elements available with which we are required to simulate the network of Fig. 5 are easily found by inspection of the diagram of Fig. 4. By inspection then the network of Fig. 6 is obtained. Comparing Figs. 5 and 6, it is evident that for equivalence the following approximations are required:

$$-j(m_1+m_2)SZ_K \cot \theta \doteq -jSZ_K \cot \theta + j\omega M + K/j\omega \qquad (10)$$

$$\frac{G^2}{j\omega L + \frac{1}{j\omega C}} \doteq jm_3 SZ_K \tan \theta \qquad (11)$$

The closest approximations are obtained when M and K and likewise L and C resonate at $f_0$, the mid-band frequency of the filter, (i. e., when $\theta = \pi/2$).

From the relationship of Equation 10 we get $$SZ_K = \frac{Sf_0 M}{\tan^2 \theta_1 + \tan \theta_1 \sec \theta_1 - \mu} \qquad (12)$$

From that of Equation 11

$$L = \frac{G^2}{8f_0 m_3 SZ_K} \qquad (13)$$

The value of $G^2$ can be determined from the relationship $$G^2 = Z_0 \cdot Z_{o3} \qquad (14)$$

where $Z_0$ is the image impedance level on the electrical side, and $Z_{o3}$ is the image impedance level on the mechanical side, that is, the value of $$Z_{I_3} \text{ at } f=f_0$$

It can then be shown that $$L = \frac{Z_0 \tan \theta_1}{8f_0} \quad (15)$$

The following table is of interest in showing the values of the various parameters per gram of receiver mass, for a series of filters having 3000-cycle band width between the theoretical cut-offs and various values of mid-band frequencies. In the calculation of L, the electrical impedance desired at each end of the filter was assumed to be 600 ohms.

| $f_0$ | $\theta_1$ | $\tan \theta_1$ | $\frac{SZ_K}{M}$ | $\frac{Z_{03}}{M}$ | $L(mh)$ | $\frac{G}{\sqrt{ML}}$ |
|---|---|---|---|---|---|---|
|  | Degrees |  |  |  |  |  |
| 6,500 | 69.20 | 2.63 | 3,900 | 11,000 | 30.4 | $1.48 \times 10^4$ |
| 10,500 | 77.15 | 4.38 | 2,220 | 10,000 | 31.3 | $1.38 \times 10^4$ |
| 14,500 | 80.69 | 6.08 | 1,575 | 9,720 | 31.4 | $1.36 \times 10^4$ |
| 18,500 | 82.70 | 7.80 | 1,220 | 9,600 | 31.5 | $1.35 \times 10^4$ |

By way of example, taking the band centered at 14,500 cycles and assuming the effective armature mass is .035 gram, the characteristic impedance of the central wire is $$SZ_K = .035 \times 1575 = 55.0 \text{ ohms c. g. s.}$$

Assuming that for this member we use piano wire, of density 7.8 and tensed to have a velocity of propagation of 40,000 cms/sec. we get $$Z_K = \rho v = 7.8 \times 40,000 = 312,000 \text{ ohms c. g. s./sq. cm.} \quad (16)$$

Hence $$S = \frac{55}{312,000} = 1.76 \times 10^{-4} \text{ sq. cms.} \quad (17)$$

This calls for a wire 0.00583 inch in diameter. Since the central wire is 3/2 wave-lengths at $f_0$, its length is required to be $$\frac{3}{2} \times \frac{40,000}{14,500} \times \frac{1}{2.54} = 1.63 \text{ inches long.} \quad (18)$$

The impedance of the transverse wire is $m_1$ times that of the central wire. Since $$m_1 = \tan^2 \theta_1 \quad (19)$$

$$m_1 SZ_K = \overline{6.08}^2 \times 55 = 2030 \text{ ohms c. g. s.} \quad (20)$$

Assuming that a tungsten wire will be used having $v = 30,000$ and $\rho = 19$, the characteristic impedance of tungsten wire is $$19.0 \times 30,000 = 570,000 \text{ ohms c. g. s./sq. cm.} \quad (21)$$

The area required is $$\frac{2,030}{570,000} = 3.5 \times 10^{-3} \text{ sq. cms.} \quad (22)$$

which calls for a wire diameter of 0.263 inch. The length required is a half wave-length at mid-band, or $$\frac{1}{2} \times \frac{30,000}{14,500} \times \frac{1}{2.54} = .407 \text{ inch.} \quad (23)$$

In a wire of such large diameter and comparatively short length, difficulties from the flexural stiffness may arise. There are two other possibilities open. The first is to use a wire vibrating in its third harmonic mode. The length will then be 1.22 inches. The required area will be reduced to one-third and the wire diameter will be .0154 inch.

If this is done, peaks of attenuation will be introduced by the transverse wire at 9650 cycles and 29,000 cycles.

The second method is to replace the transverse wire by a lumped mass and a discrete stiffness resonating at 14,500 cycles, a convenient physical structure being very similar to that of the transducer armatures and springs. An illustrative structure of this type is shown in Fig. 13 and the resulting filter is diagrammatically illustrated in Fig. 14. In Fig. 13 the bar 72 provides a lumped mass, the spring 70 provides a discrete stiffness. The ends of spring 70 are clamped to supporting frame 64 by blocks 66 and screws 68. Bar 72 is normally horizontal and is pressed against longitudinal wire 62 (shown more fully in Fig. 14) in precisely the same manner as the transducer armatures. Openings 65 are provided in supporting frame 64 to give adequate clearance to avoid contact with wire 62.

The effective mass required by this method is calculated from $$M' = \frac{2m_1 SZ_K}{8f_0} = \frac{2,030}{4 \times 14,500} = .035 \text{ gm.} \quad (24)$$

For a 600-ohm filter, the self-inductance required is 31.4 mh. The force factor needed is, therefore, $$G = 1.36 \times 10^4 \sqrt{ML}$$
$$= 1.36 \times 10^4 \sqrt{0.035 \times 31.4} \times 10^6 \quad (25)$$
$$= 1.43 \times 10^7 \text{ c. g. s.}$$

This completes the calculations required for the design of the illustrative filter.

Any number of additional filter sections, each of $2\pi$ radians phase shift may be added by extending the length of the central wire in units of $2\theta$ per added section and adding an additional transverse wire, or one device of the type illustrated in Fig. 13, per section appropriately spaced along the wire. This process is diagrammatically illustrated in Fig. 11 where a filter having an additional section as compared with the structure of Fig. 4 has been formed by employing a central or longitudinal wire 52 the length of which has been increased over the length of wire 20 of Fig. 4, by a distance equal to $2\theta$ and a second transverse wire 56 has been added to the two transverse wires 54 and 56 of the structure of Fig. 11 being spaced along longitudinal wire 52, a distance of $2\theta$ from each other and from the nearer transducer to each of these wires, respectively, as shown.

For a filter of $n$ sections, each of $2\pi$ radians phase shift, the configuration will then consist of a central wire $2n\theta$ in length, crossed by $n-2$ identical transverse wires, spaced at intervals of $2\theta$.

The simplest filter obtainable, using the element proportions given above is obtained by a length $4\theta$. The resulting filter shown diagrammatically in Fig. 12A has $4\pi$ radians phase shift and consists simply of longitudinal stretched wire 58 having a length of $4\theta$, and a transducer 25 located at a distance of $\theta$ from each end of wire 58. A condenser 30 is preferably associated with each transducer winding as described above.

It is possible to derive another type of filter using a single wire and two transducers which can be built up in sections of $\pi$ radians phase shift. This latter type of filter is illustrated diagrammatically in Fig. 12B. This type requires a complete recalculation of the results in accordance with Equations 26 to 31, inclusive, given below. This type will be found to have favorable element values for band-pass filters passing relatively narrow frequency bands. The structure as shown in Fig. 12B consists of a central wire 60, 3θ long, with a separation of θ between the driving points, and between each driving point and the nearer end of wire 60. For the general case, employing this structure $$m_1 = \tan\theta_1 \cdot \tan\frac{\theta_1}{2} \qquad (26)$$

$$m_2 = \tan\theta_1 \qquad (27)$$

$$m_3 = \cot\theta_1 \qquad (28)$$

$$SZ_K = \frac{8f_0 M}{m_1 + m_2 - 1} \qquad (29)$$

$$Z_{01} = Z_{02} = Z_{03} = SZ_K \qquad (30)$$

$$L = \frac{Z_0 \tan\theta_1}{8f_0} \qquad (31)$$

As mentioned above, the electromechanical transducers 25 of Fig. 1 are of the rocking armature type. The structure and nature of the transducers is shown in Figs. 1 and 2. In Fig. 2 only the magnetic circuits of the transducer are shown so that alternating-current and direct-current flux paths may be made more readily apparent. In Fig. 2, large arrows are employed to indicate direct or unidirectional flux paths and small arrows are employed to indicate alternating flux paths. Fine lines are also added to indicate fringing and leakage flux paths. Both the core 24 and the armature 26 are preferably built up by combining a suitable number of appropriately shaped 45 per cent permalloy laminations 0.002 inch thick.

A feature of the transducer design is the use of two permanent magnets 34 to supply the direct-current flux, in the air-gaps in which the ends of the armature 26 are positioned. The arrangement shown has the advantage over the use of a single centrally placed magnet, in that the central portions of the armature 26 carry no direct-current flux. As a result, it is possible, with no increase in armature reluctance to alternating-current flux, to reduce the cross-sectional area of the armature to less than half of that required by the transducers of the prior art equipped with a single magnet.

The effective mass of the armature 26, including that of the associated torsional spring 28, can therefore for the transducers of this invention readily be made .035 gram as assumed in the above-mentioned example.

The calculation of the transducer force factors and inductances, taking leakage into account, is conveniently carried out by the method now commonly employed by those skilled in the art of electromagnetic design.

The method is to calculate the reluctances of the various flux paths indicated in Fig. 2 and described in detail hereinafter and then consider the network made up of a ladder network of inductances, each coil having the reluctance of the appropriate section of the magnetic path and the turns on each coil being the same as the total turns used on the transducer.

Following this idea, the principal alternating-current flux paths in the transducer are determined. The resulting network of inductances is shown in Fig. 3. The force factor $G_0$ is that which would be obtained if there were no leakage and all the reluctance were concentrated in the two air-gaps.

Where N is expressed in units of 1,000 turns, A is the sectional area in square inches, W is the width of the sides of the vertical portions of core 24 assuming a square cross-section for them, and $l$ with an appropriate subscript is the length of the path in each instance, then the inductances in henries of the several equivalent coils of the network of Fig. 3 are given by the formulae $$\frac{L_1}{2} = \frac{N^2 A_1}{2X_0} \times \frac{1}{31.4} \qquad (32)$$

$$\frac{L_2}{2} = \frac{\mu_2 N^2 A_2}{2l_2} \times \frac{1}{31.4} \qquad (33)$$

$$\frac{L_3}{2} = \frac{L_1}{2} \times \frac{12 X_0}{W} \qquad (34)$$

$$L_4 = \frac{\mu_4 N^2 A_4}{l_4} \times \frac{1}{31.4} \qquad (35)$$

$$\frac{L_6}{2} = \frac{\mu_6 N^2 A_6}{2l_6} \times \frac{1}{31.4} \qquad (36)$$

$$L_7 = \frac{\mu_7 N^2 A_7}{l_7} \times \frac{1}{31.4} \qquad (37)$$

Where $L_1$ is the inductance of the winding 32 of the transducer 25, $L_2$ is the equivalent combined inductance of the ends of the armature which carry both alternating-current flux and direct-current flux, $L_3$ is the equivalent combined inductance of the leakage flux between armature 26 and core 24 at both air-gaps, $L_4$ is the equivalent inductance of the longitudinal alternating-current flux path of armature 26, $L_6$ is the equivalent inductance of the vertical portions of core 24, and $L_7$ is the equivalent inductance of the horizontal portion of core 24.

The inductance $L_5$, representing the leakage across the upper ends of core 24, may be calculated approximately by assuming as the corresponding reluctance, three times that of a column of air the cross-sectional area of which is the total surface of one core limb and the length of which is the separation between the faces, or $l_4$. The inductance thus found will be slightly greater than that which would be found by more rigorous methods, but the error is in the majority of cases negligible and in the remaining cases of such a nature as to be substantially harmless.

Hence, we may, for all practical purposes, take $L_5$ as $$L_5 = \frac{1}{3} \times \frac{4 \times l_0 N^2}{l_4} \times \frac{1}{31.4} \qquad (38)$$

The term $$\frac{L_2}{2}$$

representing the fringing around the air-gap is calculated from an empirical Formula 32 long used in the art. It has been found that the leakage reduces the reluctance of an air-gap by a factor $$1 + \frac{3 l p X_0}{A}$$

where $lp$ is the perimeter of the vertical portion of the core, A the area of the air-gap and $X_0$ the length of the air-gap. The ratio $lp/A$ is a minimum for either a circular or a square section. Using a square section whose sides are $w$, we get the required expression for $$\frac{L_2}{2}$$

The force factor $G_0$ is given by the formula $$G_0 = C \frac{B_0 L_1}{\pi N} \times 10^6 \text{ c. g. s.} \qquad (39)$$

Here $B_0$ is the direct-current flux density in the gap, $L_1$ is in henries, $N$ is in thousands of turns, $C$ is a numerical factor of an approximate value of 0.8 to correct for leakage not otherwise taken into account.

The actual force factor, $G$ may be found from the relation $$G = G_0 \frac{I_1}{I_7} \qquad (40)$$

where $I_7$ is the actual input current and $I_1$ is the current as modified by the equivalent inductances $L_1$ to $L_7$ operating as indicated in Fig. 3.

The effective self-inductance $L$ is calculated from the input impedance of the ladder network of Fig. 3.

By way of example, for a transducer of the type illustrated in Figs. 1 and 2 where the core 24 had square vertical members $\frac{1}{16}$ inch on a side, a horizontal member $\frac{1}{16}$ inch thick by $\frac{1}{8}$ inch high, and over-all dimensions of $\frac{3}{8}$ inch by $\frac{5}{16}$ inch by $\frac{7}{16}$ inch, and the armature was $\frac{3}{8}$ inch by $\frac{1}{8}$ inch by $\frac{1}{32}$ inch the equivalent inductances of Fig. 3 were found to be $$\frac{L_1}{2}(\text{air-gaps of }.003'') = 2.06(10^{-2}) N^2$$

$$\frac{L_1}{2}(\text{air-gaps of }.004'') = 1.55(10^{-2}) N^2$$

$$\frac{L_2}{2} = 4.97(10^{-4}) \mu N^2$$

$$\frac{L_3}{2} = 1.19(10^{-2}) N^2$$

$$L_4 = .398 \ N^2$$

$$L_5 = 1.98(10^{-3}) N^2$$

$$\frac{L_6}{2} = 2.48(10^{-4}) \mu N^2$$

$$L_7 = .795 N^2$$

The assumption was made that in $L_4$ and $L_7$ the permeability remains constant at 1,000, independently of the polarization and that those sections that do carry direct-current flux have the same alternating-current permeability for a given polarizing flux in the air-gap.

Figure 7:
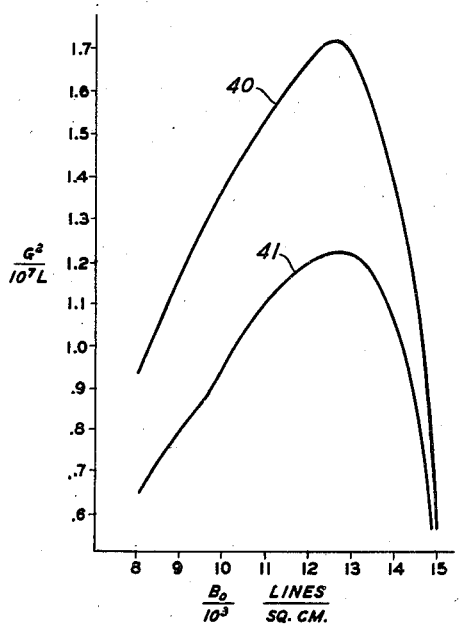
Fig. 7 shows the variation of the quantity $$\frac{G^2}{L}$$

The procedure for calculating the transducer parameters is then as follows:

Assuming a given air-gap and definite values of flux density in the gap, the corresponding alternating-current permeabilities are found from published data such, for example, as may be found in the Bell System Technical Journal, vol. XV, of January, 1936, at pages 113 to 135, inclusive, particularly pages 124 and 125. This determines the network elements of Fig. 3. Hence, we can calculate $I_1/I_7$ $G_0$, $G$, $L$ and $G^2/L$. The last two are shown in curves 40 to 43, inclusive, plotted in Figs. 8 and 7, respectively, for air-gaps of .004 inch and .003 inch. Curves 40 and 42 obtain for the smaller air-gap.

Reverting back to the illustrative filter design, the value of $$\frac{G^2}{ML}$$

is given as $1.84 \times 10^8$. The effective mass of the armature is .035 gm. and hence the required value of $$\frac{G^2}{L}$$

is $.645 \times 10^7$. Assuming an .004 inch gap, this value can be obtained at $B_0 = 8000$ or $B_0 = 14,900$. The corresponding inductances are 23.2 and 8.6 millihenries for 1,000 turns. Since the required inductance is 31.4 millihenries, the number of turns required are 1,160 and 1,910, respectively.

This raises the question as to which operating point should be chosen. The criterion to apply is the over-all electrical Q obtainable. The electrical Q may be calculated as follows:

(a) Eddy-current losses

Knowing the permeability, resistivity and thickness of the sheet material used, we can calculate the dissipation associated with the various inductances in the network of Fig. 3. If the "Q's," that is the indices of electrical efficiency as expressed by the ratio of reactance to resistance, of the component "coils" ($L_2$, $L_4$, $L_6$, $L_7$, etc.) are high enough, the current distribution is not appreciably different from the dissipationless case. This current distribution is, of course, that which was obtained above when the effective inductance and force factor were calculated. To obtain the effective resistance, we merely sum up the power losses in the various branches. Proceeding in this manner, we obtain the curves 44 and 45 shown in Fig. 9 for air-gaps of .004 inch and .003 inch, respectively.

(b) Copper losses

The curves 42 and 43 of Fig. 8 give the inductance of the transducer winding per 1,000 turns. From the space available and making allowances for winding efficiency, we calculate the resistance of a 1000-turn coil and thus calculate the "copper Q" or "$Q_c$." This is shown in curves 46 and 47 of Fig. 10 for air-gaps of .003 inch and .004 inch, respectively.

The over-all Q is $Q_e \cdot Q_c / (Q_e + Q_c)$, shown in curves 48 and 49 of Fig. 10 for air-gaps of .003 inch and .004 inch, respectively.

From these curves it is evident that the copper loss is the controlling factor and hence in the example worked out, it is preferable to work at a flux density of 8,000 lines rather than at 14,900 lines. That the electrical Q is amply large can be seen by noting that for a uniform loss throughout the pass band not to exceed 6 decibels, the minimum electrical Q required is 9.5, while the minimum shown on these curves is approximately 19 and the maximum is 36.

Numerous other applications of the principles of the invention will occur to those skilled in the art. The above-described embodiments are merely illustrative of the application of said principles. The scope of the invention is defined in the following claims.

What is claimed is:

1. In an electromechanical filter, a magnetic-attraction electromechanical transducer of the rocking armature type, said transducer including polarizing means comprising two permanently magnetized members, said members being shaped and positioned adjacent the two ends of the rocking armature, respectively, so that each member will polarize the respective near end only of said armature whereby the direct polarization of said armature is confined to the ends thereof, the mass of the armature may be substantially reduced without increasing the reluctance to alternating flux of said armature and the design of said filter is thereby facilitated.

2. An electromechanical band-pass filter comprising a stretched wire, the length of said wire being three quarter wave-lengths of the mid-band frequency of said filter, a first magnetic-attraction transducer of the rocking armature type disposed to impart vibrating energy to said wire at a point one quarter wave-length of the mid-band frequency from one end of said wire, a second transducer of the same type as said first transducer disposed to absorb vibratory energy from said wire at a point one quarter wave-length of the mid-band frequency from the opposite end of said wire and an electrical condenser in series with the electrical coil of each of said transducers, the mechanical and electrical portions of said filter being proportioned to pass energy falling within a predetermined band of frequencies and to attenuate other frequencies.

3. An electromechanical filter comprising a longitudinal stretched wire, a plurality of transverse stretched wires, coupled mechanically to said longitudinal wire at their mid-points and spaced apart along the length thereof, a first electromagnetic transducer coupled mechanically to said longitudinal wire near one end thereof, a second electromagnetic transducer coupled mechanically to said longitudinal wire near the opposite end thereof, said wires and said transducers being proportioned and tuned with respect to each other and to a particular frequency whereby the filter is responsive to vibrations in a frequency band centered about said particular frequency, the transducers being spaced one quarter wave-length of the mid-band frequency of said filter from their respective ends of said wire and the transverse wires being spaced at intervals of one half wave-length of the mid-band frequency of said filter with respect to each other and the said transducers.

4. An electromechanical filter comprising a longitudinal stretched wire, a first electromagnetic transducer coupled mechanically to said wire near one end thereof, a second electromagnetic transducer coupled mechanically to said wire near the opposite end thereof, and a mechanical vibratory system comprising a lumped mass supported by a discrete elastance, said vibratory system being coupled mechanically to said wire at the mid-point thereof, the said wire, transducers and vibratory system being proportioned and tuned with respect to each other and to a particular frequency whereby the filter is responsive to vibrations in a frequency band centered about said particular frequency, the said wire being six quarter wave-lengths of the mid-band frequency of said filter, and the transducers being coupled to said wire at one quarter wave-length of the mid-band frequency of said filter from their respective ends of said wire.

EMORY LAKATOS.